June 18, 1957 M. B. BEACH 2,795,788
TEMPLATE FOR BELT FASTENERS
Filed April 9, 1956 2 Sheets-Sheet 1
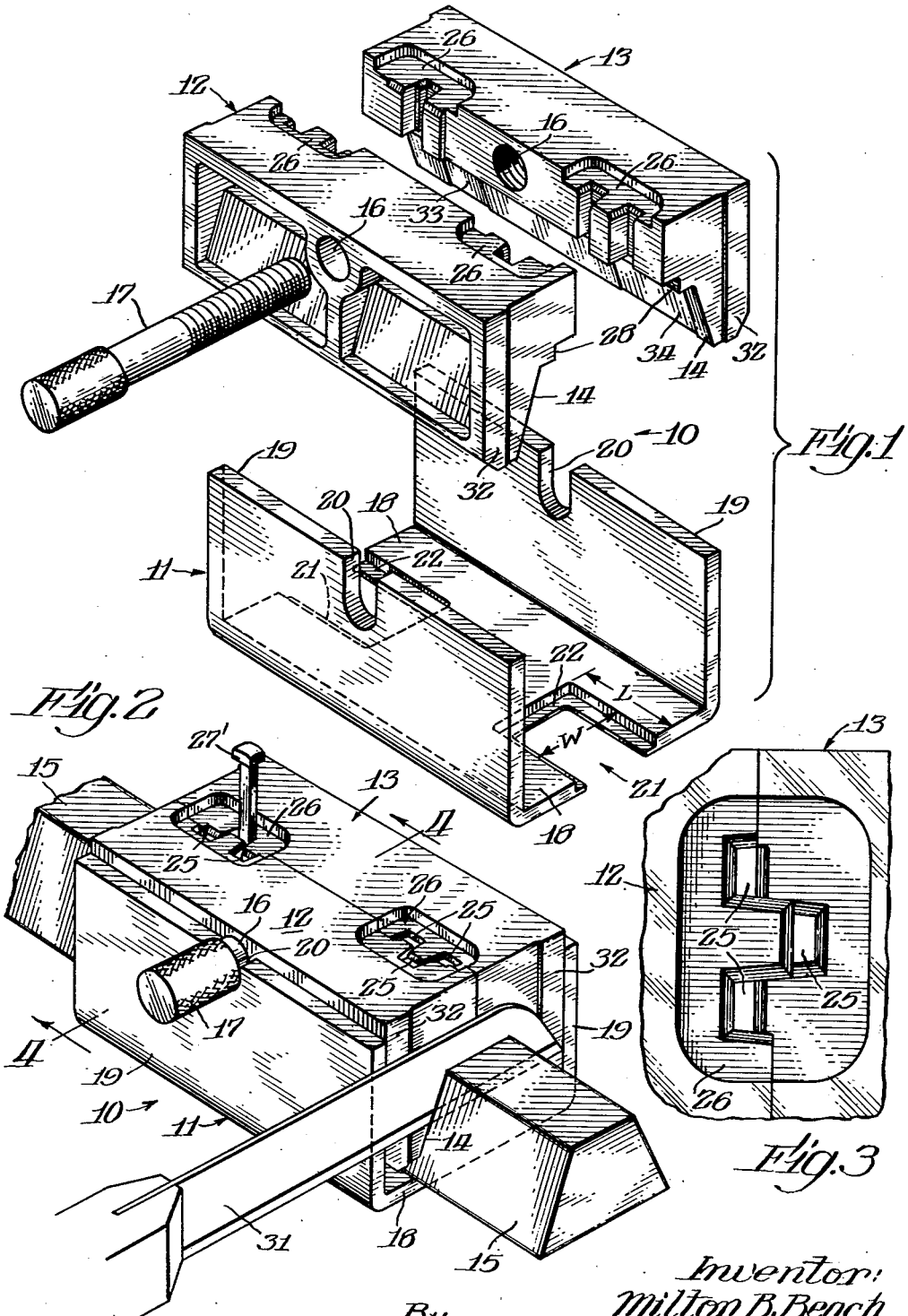
Inventor:
Milton B. Beach
By Soans, Glaister & Anderson Attys.

June 18, 1957 M. B. BEACH 2,795,788
TEMPLATE FOR BELT FASTENERS
Filed April 9, 1956 2 Sheets-Sheet 2
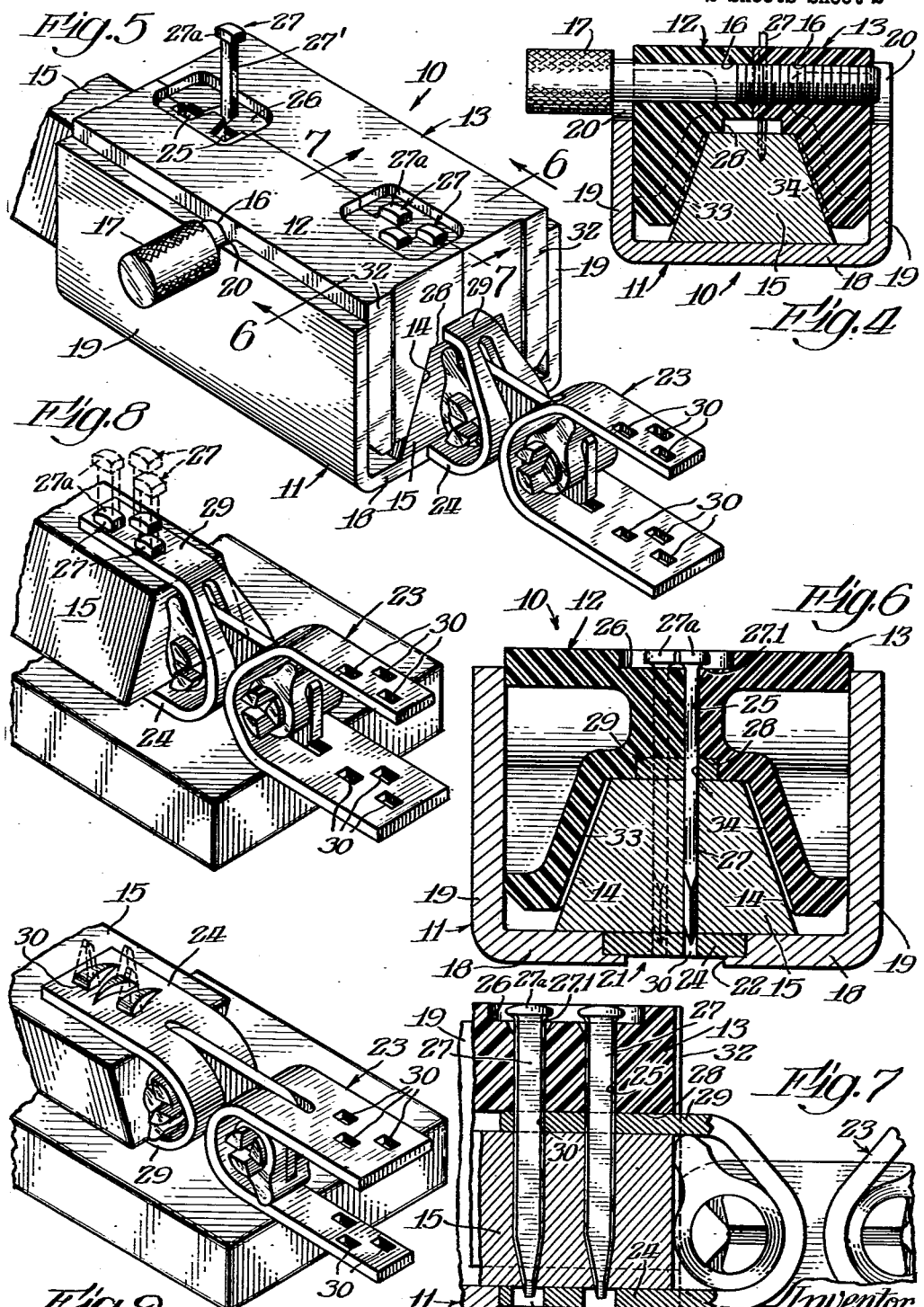
Inventor:
Milton B. Beach
By Evans, Pfleister & Anderson
Attys United States Patent Office 2,795,788
Patented June 18, 1957

2,795,788
TEMPLATE FOR BELT FASTENERS

Milton B. Beach, Wheaton, Ill., assignor to Flexible Steel Lacing Company, Chicago, Ill., a corporation of Illinois Application April 9, 1956, Serial No. 577,171

4 Claims. (Cl. 1—49.8)

The present invention relates generally to fasteners which are used to secure the ends of a flexible drive belt together, and is more particularly directed to means affording proper cutting of the end of the belt and which is also effective in properly securing the fastener to the end of the belt.

In the connection of a fastener to the adjoining ends of a flexible drive belt, such as the conventional V-belt, there is a problem in centering the fastener with respect to the opposite surfaces of the belt and in accurately placing the fastening elements, such as nails, through the aligned openings provided in the fastener for securing it to the belt. Furthermore, it is generally necessary to cut off a small length at each end of the belt, in order to provide a plane surface at each end which is at right angles to the axis of the belt and which can properly receive the belt fastener. Heretofore, special tools have been provided for the sole purposes of affording proper cutting of the ends of the drive belt.

It is the principal object of this invention to provide novel means for accurately positioning and securing a fastener on the end of a flexible drive belt. A further object of the invention is to provide a novel tool, which is effective to provide for a proper cutting of the end of a drive belt and which is also effective to accurately secure a fastener on the ends of the belt.

Other objects and advantages of the invention will become apparent with reference to the accompanying description of the selected embodiment illustrated in the drawings, wherein:

Fig. 1 is a perspective view of the assembly of parts comprising the selected embodiment of the invention.

Fig. 2 is a perspective view of the template seen in Fig. 1, with the parts assembled in position on a flexible drive belt.

Fig. 3 is an enlarged, top plan view of a portion of the structure in Fig. 2.

Fig. 4 is a sectional view taken along the line 4—4 in Fig. 2.

Fig. 5 is a view similar to Fig. 2, with the belt fastener secured in position on the end of the drive belt.

Fig. 6 is a sectional view taken along the line 6—6 in Fig. 5.

Fig. 7 is a sectional view taken along the line 7—7 in Fig. 5.

Figs. 8 and 9 illustrate the steps followed in completing the securing of the belt fastener to the belt after the two have been attached together in the manner shown in Fig. 5.

One of the most common methods used for securing the ends of a flexible drive belt together, after the belt is positioned on the drive pulleys or the like, involves the use of a metal belt fastener. This fastener consists generally of a pair of U-shaped members which are suitably linked together in a manner affording relative pivotal movement therebetween. The opposite leg portions of each of the U-shaped members ordinarily include a series of aligned openings through which fastening elements such as nails are driven to secure the fastener to the belt. An example of this type of fastener is shown in U. S. Patent 2,189,291, issued to J. C. Olsen on February 6, 1940.

The length of service obtained with a drive belt connection of the type referred to above, as well as the efficiency of the drive belt, is dependent to a considerable extent on the proper position of each of the U-shaped members of the belt fasteners on the end of the drive belt. One of the more troublesome features of the ordinary belt fastener is that it is difficult to drive a nail or other fastening means through the openings in one leg of the U-shaped part so that the nail passes into and through the openings on the opposite side of the fastener. A slight inclination of any of the nails, while it is being driven into the belt, prevents the point of the nail from striking the opening on the opposite side. It is also important to the proper positioning of the belt fastener that the ends of the belt present a plane surface that is at right angles to the longitudinal axis of the belt.

With the present invention there is provided novel means which is particularly effective both in serving as a guide for the knife used in the transverse cutting of the ends of the belt and in accurately positioning the belt fastener on the ends of the belt.

With reference to the drawings, it will be seen that the selected embodiment of applicant's invention is in the form of a template or tool 10, having a channel-shaped base member 11 and a pair of complementary block members 12 and 13 which are adapted to be fitted together within the channel member. The complementary members are provided with inwardly facing, inclined surfaces 14, which are adapted to engage the inclined sides of the V-belt 15, and these separable portions are maintained in position by means including aligned bores 16, at least one of which is threaded, which extend through each of the blocks 12 and 13 at a position above the inclined surfaces thereon. A screw 17 is threaded into the aligned bores 16 to adjustably hold the separable block members in pressing engagement with each other and with the V-belt 15. The described portions of the template may be of any suitable material, but in a particularly satisfactory embodiment which has been tested the channel member 11 is made of a suitable metal and the complementary block portions 12 and 13 are made of nylon. A brass screw 17 is used to adjustably position the nylon wedge blocks within the channel.

It is, of course, important to the effective functioning of the described template that close tolerances be followed throughout the making of the component portions. Any allowance for relative movement between the parts after they have been positioned on the drive belt, or for relative movement of the belt fastener after it has been placed on the end of the belt will appreciably reduce the effectiveness of this tool.

As seen particularly in Fig. 1, the channel-shaped member 11 includes a web portion 18 having a width substantially greater than the maximum width of the particular size of V-belt that is to be handled by the template, and a pair of oppositely facing flanges 19 which are substantially deeper than the vertical dimension of the V-belt. A pair of aligned U-shaped notches 20 are formed in the edges of the flanges 19 at a position approximately midway between the ends of the channel member 11. The opposite ends of the web 18 are provided with rectangular cut-out portions or recesses 21, each being formed so as to provide a lip or ledge 22 extending around the three sides of the opening. The maximum width of each recess 21, that is the width W of the portion above the ledge 22, is designed to conform with the width of the V-belt fastener 23 to be used and is of a depth equal to the thickness of one leg portion of the fastener. The length of the portion of the recess 21 which extends above the ledge 22, indicated as L, is such that there is provided vertical alignment of the nail holes in the fastener with the nail guide holes formed by the blocks 12 and 13, in a manner to be described.

Consequently, one end of a fastener 23 (Fig. 5) is positionable to extend within the cut-out portion 21 a predetermined distance, with one leg 24 of the fastener being flush with the inner face of the web and supported by the ledge 22. Although the illustrated embodiment includes a cut-out portion 21 at each of the opposite ends of the channel member 11, it will be understood that only one such recess is necessary. The presence of two such recesses eliminates the necessity for particular observance of the manner in which the channel member is placed on the end of the V-belt.

The separable block portions 12 and 13 which are adapted to fit within the channel member 11 are identical in their configuration, except for the complementary arrangement of notches along their inner edges which are designed to provide a guide means for the nails which are to be driven through the belt fastener and the drive belt. The nail receiving openings 25 are formed in a pair of depressed portions 26 of the mating block members which are disposed at opposite ends thereof. The nail guide openings are formed by pressing the complementary members together and each opening has at least one side, but less than all four sides, formed by one of the block members 12 or 13. These openings are preferably rectangular in shape and of a cross-sectional area which is slightly less than the cross-sectional area of the rectangular nails 27 used to secure the fastener in position. Preferably the openings are made at least .001 to .002 inch smaller in width and thickness than the minimum size allowed for the nails. This arrangement provides a preloading for the nails which insures a tight fit between the nail and the guide openings so that the nail is properly guided through a path perpendicular to the upper face of the V-belt. The upper edges of the nail guide openings are preferably tapered outwardly, as seen particularly in Fig. 3, in order to facilitate insertion of the nails and to clear the slight shoulder or fillet 27.1 (Fig. 7) formed under the nail head. It is also desirable that the depth of the nail guide openings 25 be sufficiently great with respect to the length of the nails being used to prevent any tilting of the nail as it is being driven into the V-belt. In this respect, very satisfactory results have been achieved by providing nail guide openings of a depth of $^{10}\!/_{32}$ inch for use in conjunction with nails having a length of $^{27}\!/_{32}$ inch. Then, too, the hardness of the nail is important in preventing any bending of the nail as it is driven through the nail guide openings and into the V-belt. A particularly satisfactory nail is one made of low carbon steel having a Rockwell Scale B hardness of between 75 and 100, with the preferred range being 85 to 95.

It has been found that it is very advantageous to utilize a relatively hard but yieldable material such as nylon, for the block members 12 and 13, particularly in that such material has great resistance to wear through abrasion and, also, this material will assume its original dimensions after the stresses imposed thereon have been removed. With a material having the described characteristics, there is sufficient yielding of the material surrounding the nail guide openings 25 to permit driving the nail downwardly through the openings and into the belt, and repeated usage of the blocks 12 and 13 does not destroy the effectiveness of the openings 25 as tight and accurate guides for fastener nails.

It will also be noted (Figs. 1 and 4–7) that the inclined surfaces 14 of the complementary block members 12 and 13 terminate at their upper ends in matching ledge portions which provide a channel or groove 28 between the upper surface of the drive belt 15 and the overlying portion of the block. The space thus provided is designed to have a width and thickness, when the block members 12 and 13 are pressed together, which is substantially the same as the width and thickness of the leg portion 29 of the V-belt fastener 23. It will be seen, therefore, that the spaces thus provided in the channel 28 and in the cut-out portion 21 in the web 18 of the channel member 11 serve to guide the end portions 24 and 29, respectively, of the belt fastener into a position wherein the nail receiving openings 30 in the belt fastener are vertically aligned with the nail guide openings 25 in the template. It is understood, of course, that the complementary members 12 and 13 have their outer end surfaces flush with the end of the channel member 11 and the end of the drive belt 15, the latter preferably being cut as seen in Fig. 2.

In using the above described template 10, the end of the drive belt 15 is placed through the channel member 11 and the block members 12 and 13 are then placed within the channel member in overlying relation to the V-belt (Fig. 2). The screw 17 is inserted in the notch 20 and threaded into the openings 16 in the block members to a position wherein the latter are tightly pressed together. This insures a registry between the end edges of the matching block members and the channel 11, and also tightly secures the V-belt 15 within the template. Relative sliding movement between the template and V-belt is further prevented by driving a nail 27′ through one of the openings at the rear of the template, as shown in Fig. 2, until the nail penetrates the V-belt sufficiently to hold it in place. The protruding end section of the V-belt is then cut off flush with the end of the template, as by means of the knife 31. In this respect it will be noted, particularly in Fig. 2, that the ends of the blocks 12 and 13 are preferably provided with extending marginal edge portions 32 which are disposed in flush relation with the ends of the flanges 19 of the channel member 11. In this way the knife 31 engages a relatively small bearing surface so as to avoid any binding between the knife and the template, and the edges 32 provide a positive guide for the knife in cutting the belt off flush with the end of the template.

The spaced apart ends 24 and 29 of the V-belt fastener are then inserted in the spaces provided in the template above and below the V-belt by the cut-out 21 and the channel 28 with the leading edge of end portion 24 abutting against the inner end of the cut-out portion 21 in the channel member 11. The aligned openings 30 in the fastener are now aligned with the nail guide openings 25 in the template. The nails 27 are inserted in the guide openings 25 and driven through the aligned openings and the belt 15 until they reach the position seen in Fig. 6. The driving of the nails is preferably done on a wood or similar surface, in order to avoid damaging the points of the nails 27 which may project slightly beyond the bottom of the channel member. And in this respect, it will be noted that the thickness of material provided at the upper part of the complementary members 12 and 13, and the recess 26 surrounding the nail guide openings at their upper ends, are designed so that the nails can be driven only a limited distance through the template. As seen in Fig. 6, the particular design of the template 10 permits the nails to be driven slightly beyond the bottom portion of the belt fastener, approximately flush with the bottom of the channel web 18, with the head portion 27a raised slightly above the level of the recess 26. This protects the points of the nails 27 and prevents the nail heads 27a from binding against the template blocks.

It will also be noted in Figs. 1 and 6 that the inclined surfaces 14 on the block members 12 and 13, at positions underlying the nail guide openings 25, are provided with recess portions 33 and 34. These recess portions are preferably somewhat wider than the area including the associated nail guide openings and they extend the entire depth of the inclined surface 14. The recesses 33 and 34 are designed to accommodate the lateral expansion of the V-belt caused by the passage of the nails 27 through the belt.

When all of the nails are positioned through the belt fastener 23 and V-belt 15, the anchor nail 27' is withdrawn and the screw 17 holding the template members 12 and 13 together is turned to release such members. The channel member 11 may be moved downwardly and the two block members 12 and 13 are then separated to free the V-belt 15 and fastener 23 from the template. The belt is then placed on a soft surface such as wood, and the nails driven through until the heads 27a bear on the belt fastener, as shown in Fig. 8. The belt is then turned over and the points of the nails bent over in the manner seen in Fig. 9. A similar operation may then be performed for the other end of the fastener 23 with respect to the opposite end of the V-belt.

It is seen, therefore, that there is provided means for readily and accurately positioning a belt fastener on the end of a flexible drive belt, in a manner such that the fastening nails may be driven through the belt in registry with the openings on the opposite side of the belt fastener. The disclosed tool or template 10 embodying applicant's invention is particularly advantageous in that it employs a very few number of parts, which are easily assembled and which are sufficiently large to avoid loss or damage. Although shown and described with respect to a particular shape of tool which is constructed of particular materials, it will be understood that other configurations of the various component parts, as well as other arrangements for such parts and other materials, might be used without departing from the principles of this invention. It is believed, however, that it is advantageous to utilize separable portions which grip the inclined surfaces of the V-belt and afford the nail guide openings, which are of a fairly rigid yet elastic material. Material of this type permits some variation in the cross-sectional dimensions of the V-belt, and also provides for a firm grip on the fastening nails while guiding and holding the latter in their operative position, without such material acquiring a permanent set or change in its dimensions.

I claim:

1. Means for holding the ends of a flexible drive belt and a belt fastener in position with respect to each other, comprising a base member having a recess at one end thereof adapted to receive one end portion of the fastener in a predetermined position relative to said base member, and a pair of complementary block members adapted to be secured to said base member in covering relation to the recess therein and with the surfaces at one end of said block members substantially coplanar with said one end of said base member, said block members including inwardly facing, spaced-apart surfaces adapted to engage opposite sides of a belt disposed on said base member, and said block members including matching upper edge surfaces at a position overlying the recess in said base member which combine to provide an elongated opening having its axis normal to said base member and adapted to guide a fastenening element through the drive belt and into an opening in the belt fastener.

2. Means for holding the ends of a flexible drive belt and a U-shaped belt fastener in fixed position with respect to each other, said means comprising a channel shaped base member including a web portion and a pair of flanges disposed generally normal to the web at opposite sides thereof, a pair of complementary block members adapted to fit between the flanges of said base member, and means for securing said block members in position relative to said base member with the one end surface of the block members substantially flush with an end of said base member, said web portion including a recess at said one end of said base member which is adapted to receive one leg of a U-shaped fastener in a predetermined position, said block members including inwardly facing, spaced-apart surfaces adapted to engage the opposite sides of a belt which is disposed on said base member with its longitudinal axis located generally centrally of the recess formed in said web, and said block members also having matching upper edge surfaces including sections thereof which combine to provide a plurality of nail guide openings adapted to overlie the recess in said web with their axes normal to the plane of said web portion of the base member.

3. A template for guiding the positioning and attachment of a U-shaped belt fastener on the end of a drive belt, said template comprising a channel-shaped base member adapted to receive one end of a drive belt between its flange portions in engagement with the web portion of said base member, one end of said web being provided with a recess portion which is adapted to slidably receive one leg portion of the belt fastener in a predetermined position, with the upper surface of said leg portion substantially coplanar with the upper surface of said web and with the other leg portion of said fastener disposed above and parallel to said one leg portion, a pair of complementary block members adapted to fit between the flanges of said base member with the upper edge portions of said block members in facing engagement with each other, and means for securing said block members in position relative to said base member with one end surface of the block members flush with one end of said base member, the lower portions of said block members being spaced apart to define a longitudinally extending opening for receiving a drive belt therebetween with the axis of the belt located centrally of the recess formed in said web, said upper edge portions of said block members including sections which combine to provide a plurality of nail guide openings when said block members are secured in said position on said base member, said nail guide openings extending generally normal to said base member and in alignment with openings provided in the leg portions of said fastener when said block members are secured in position on said base member.

4. A template for guiding the positioning and attachment of a U-shaped belt fastener on the end of a flexible V-belt, said template comprising a channel shaped base member adapted to receive one end of a V-belt between its flange portions and in engagement with the web portion of said base member, one end of said web being provided with a centrally located recess having a peripheral ledge disposed in spaced relation to the belt supporting surface of the web, whereby one leg portion of a U-shaped belt fastener may be slidably positioned within the recess in flush relation to the belt supporting surface of said web and with the other leg portion of the fastener disposed above and parallel to said one leg portion, a pair of matching block members adapted to fit between the flanges of said base member with the upper edge portions of said block members in facing engagement with each other longitudinally of the base member, and means for securing said block members in position relative to said base member with one end surface of the block members flush with the adjacent end of said base member, the lower portions of said block members including spaced-apart inclined surfaces adapted to engage the opposite sides of a V-belt and hold the latter in position on said base member with the V-belt located generally centrally of the recess in said web, the upper edge portions of said block members including complementary sections which combine to provide a plurality of nail guide openings disposed in alignment with openings provided in the leg portions of said belt fastener when said block members are held together by said means for securing them in position on the base member, the nail guide openings formed by said block members extending generally normal to said web, and said block members also defining a groove extending longitudinally thereof at a position intermediate the nail guide openings and the portion of the block which is adapted to engage the V-belt, the groove thus formed being adapted to slidably receive the other leg portion of the belt fastener.

No references cited.